3,298,991
PIGMENTATION OF POLYAMIDES WITH 2,9-DIMETHYL-QUINACRIDONE
Herman Gerson, New York, N.Y., and John F. Santimauro, Wyckoff, and Vincent C. Vesce, Saddle River, N.J., assignors to Allied Chemical Corporation, a corporation of New York
No Drawing. Filed Nov. 30, 1961, Ser. No. 156,146
8 Claims. (Cl. 260—37)

This invention relates to the pigmentation of polyamides, especially synthetic linear polyamides such as the nylons.

Polyamides such as those derived from ε-caprolactam (nylon-6), hexamethylene diamine-adipic acid (nylon-66), and other nylons, the preparation of which is disclosed, for example, in United States Patent 2,345,533 of March 28, 1944 and in numerous other patents and publications, are thermoplastic resins. They have found wide utility in the textile and plastic fields. Particularly important are the high molecular weight linear polyamides characterized by repetitive —NHCO-linkages; of the more important of these the following can be mentioned:

polycaproamide from ε-caprolactam (nylon 6);
polyundecanoamide from undecanolactam (nylon 11);
polyhexamethylene adipamide from hexamethylene diamine-adipic acid salt (nylon 66); and
polyhexamethylene sebacamide from hexamethylene diamine-sebacic acid salt (nylon 610).

These linear polymers have molecular weights in excess of about 8000. Typical fibers have a molecular weight of about 20,000, and typical molding resins have a molecular weight of about 40,000. The expression "synthetic linear polyamide" is used herein and in the claims to mean such nylons.

Nylons are processed by heat and pressure into desired shapes such as extrusions, moldings, filaments, fibers, etc. To impart color thereto it is necessary that the pigment added for this purpose be capable of withstanding the heat and pressure of the processing; the coloring agents should not decompose or undergo substantial shade alteration. The conditions employed in processing nylons have been found to be too drastic for most organic pigments and hence inorganic substances, such as carbon black, iron oxides and the like, have been chiefly used in effecting the coloration of nylons. These inorganic pigments impart colors lacking in the brightness and clarity desired for many nylon products. Heretofore known organic pigments distinguished by their high tinctorial strength, brightness and clarity of shade, for the most part, are not stable under the conditions of temperature and pressure employed in the polymerization, spinning and molding of high molecular weight linear polyamides.

We have found that the pigment, 2,9-dimethyl quinacridone, which has the structural formula

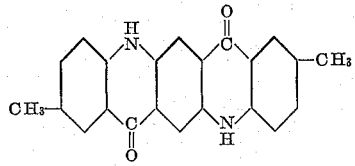

and which can also be termed 2,9-dimethyl-quino-(2,3,b)-acridine-7,14-dione, is surprisingly stable in admixture with polyamides (and with the monomers from which the polyamides are produced) during the processing of the polyamides, and imparts thereto pleasing shades from bright pink to deep bluish red, of excellent fastness characteristics, i.e., fast to light and durable with respect to gloss and weathering. For the sake of brevity, the expression "2,9-dimethyl-quinacridone" will be employed hereinafter to refer to this organic pigment.

We have found that mixtures of polycaproamide and 2,9-dimethyl-quinacridone can be subjected to temperatures in the range of from 400° to 700° F. in a molding press to obtain formed articles of clear, bright pink to deep blue-red shades which are fast to light. Adding 2,9-dimethyl-quinacridone to ε-caprolactam monomer, polymerizing the mass at temperatures within the range of from 350° to 575° F. in known manner, and thereafter spinning the molten pigmented polycaproamide as usual produces a pigmented fiber of bright pink to deep bluish-red shade having excellent fastness characteristics.

The amount of 2,9-dimethyl-quinacridone which can be incorporated in the polyamide composition can vary over a wide range. The particular amount used is dependent upon the depth of shade or coloration desired. Thus light tints can be obtained with an amount of pigment as low as 0.0001 part per 100 parts of resin composition. Deep shades are obtained when 5 parts or more are used per 100 parts of resin composition. A master batch can be produced by adding the 2,9-dimethyl-quinacridone to the polyamide monomer or polymer in amount, say, of from 0.5 to 100 parts, preferably about 25 parts of pigment per 100 parts of polyamide, and mixing the master batch with the unpigmented resin to produce a mixture which is molded or spun to obtain a satisfactory product of lighter shade. Thus, in general, the invention contemplates the addition of the pigment in amounts of from about 0.0001 part up to about 100 parts or more per 100 parts of resin composition.

The incorporation of the 2,9-dimethyl-quinacridone in the polymer can be done by known methods. For example, pellets of the polymer can be surface-coated by mixing the pigment and pelletized polymer in a suitable mixer and the thus coated pellet fed to a molding press or fiber spinner. Alternatively, the 2,9-dimethyl-quinacridone can be mixed with water to form an aqueous paste, the polymer added to this paste, the mixture dried and the dried mix after additional mixing, if necessary, for example in a ribbon mixer, fed to a molding press or fiber spinner. The 2,9-dimethyl-quinacridone, either in dry form or as an aqueous paste, may be mixed with the molten monomeric material, e.g., caprolactam, and the mixture polymerized and formed as customary.

2,9-dimethyl-quinacridone can be prepared in known manner by the cyclization of 2,5-di-(p-toluidino)-terephthalic acid or the esters thereof in a suitable agent, e.g., polyphosphoric acid. The intermediate terephthalic compounds are obtainable as described by Lieberman in Liebig's Annalen 404, 272–321, by condensing p-toluidine with an ester of succinyl-succinic acid and oxidizing the product thus obtained. The free terephthalic acid is obtained by saponification of the oxidized product. 2,9-dimethyl-quinacridone is available commercially; it can be purchased from Allied Chemical Corporation under the designation Quindo Magenta.

2,9-dimethyl-quinacridone is unique and outstanding in its property of imparting clear coloration of excellent fastness from bright pink to deep bluish-red shades to synthetic linear polyamides subjected to processing to produce desirable products. Analogous substituted quinacridones prepared, for example, by substituting for the p-toluidine in the above described synthesis of 2,9-dimethyl-quinacridone, o-toluidine, m-toluidine, m-xylidine, 5 - chloro - 2 - methylaniline, p-fluoroaniline, p-anisidine, o-phenetidine, 3 - chloro - 4 - methylaniline, as well as unsubstituted quinacridone, i.e., quino-(2,3,b)-acridine-7,14-dione, were found not to be stable to forming treatments in admixture with polyamides, i.e., mixtures of these analogous quinacridones with polyamides, upon subjection to heat and pressure, changed in color, usually from red to yellow.

The following examples are given for illustrative purposes. It will be appreciated the invention is not limited to these examples.

Parts and percentages are by weight and temperatures are given in degrees Fahrenheit.

*Example I*

0.05% of 2,9-dimethyl-quinacridone was mixed with a polycaproamide molding resin in cylindrical pellet form (approximately 2 x 2 mm.) and the mixture placed in a cylindrical container known as a resin can. The can was approximately half filled with the mixture. It was closed, placed on a roller mixer, on which the can was rotated for about 5 to 15 minutes. The reddish colored surface-coated polymer was then melted, extruded and pelletized using a 1½ inch extruded, known as a Cumberland Grinder System. The temperature at which the extrusion was effected was 446°. The resultant pellets were then molded into discs two inches in diameter and ⅛ inch thick in a Lester Injection Molding Press at three different cylinder temperatures, namely, 475°, 525° and 550°.

For comparative purposes, two other quinacridone pigments, namely, 4,11 - dimethyl - quinacridone (4,11-dimethyl-quino (2,3,b) acridine-7,14-dione); and 3,10-dimethyl-quinacridone (3,10-dimethyl-quino (2,3,b) acridine-7,14-dione) were mixed with the same polycaproamide in the same proportions and processed in exactly the same manner. These two pigments are identified as B and C, respectively, in the following table, in which the results of the processing are summarized:

| Pigment in Resin Mix | Color of Extruded Pellets | 475° | 525° | 550° |
|---|---|---|---|---|
| Present Invention | Blue red | Blue red | Blue red | Blue red. |
| B | Orange red | Yellow | Yellow | Yellow. |
| C | Reddish orange. | Orange | Orange | Orange. |

Only the mix embodying the present invention was stable to the forming treatments, namely, the pelletizing and molding treatments used in this example. Comparative mixes containing pigments B and C were unstable; the color of the surface-coated material changed substantially toward yellow in the case of the mix containing pigment B and orange in the case of the other mix containing pigment C.

*Example II*

This example involved a substantial duplication of Example I except that instead of polycaproamide (nylon-6) a polyhexamethylene adipamide from hexamethylene diamide-adipic acid salt (nylon-66) was used. As in Example I, the mix was stable to the forming treatments; pellets having blue-red shades were obtained at each of the cylinder temperatures 475°, 525° and 550°.

*Example III*

Extruded polycaproamide (nylon-6) pellets were surface-coated with about 0.02% of 2,9-dimethyl-quinacridone as described in Example I. The coated pellets were melted at 500° F. and spun into a mono-filament. The resultant filament was pigmented a bright bluish-red.

For comparative purposes, 3,10-dimethyl-quinacridone was mixed with the same extruded polycaproamide in the same amount and under the same conditions. A dull orange colored fiber was obtained indicating that the pigment had altered in shade during the spinning.

From the above illustrative examples, it is evident that polyamide compositions comprising 2,9-dimethyl-quinacridone are uniquely stable to heat during the processing thereof and that pigmented polyamides having from pink to deep bluish-red shades are thus obtainable, which pigmented compositions are characterized by fastness to light and durability with respect to gloss and weathering.

These characteristics of 2,9-dimethyl-quinacridone of imparting light and weather fast pink to bluish-red shades to synthetic linear polyamides with which they are admixed is unique to 2,9-dimethyl-quinacridone pigments. The use of other quinacridones in pigmenting polyamides results in mixes in which, upon processing, decomposition of the quinacridone takes place with consequent undesirable color change.

Since certain changes in carrying out the process of pigmenting polyamides and the resultant pigmented polyamides can be made without departing from the scope or spirit of this invention, it is intended that all matter contaned in the above description shall be interpreted as illustrative and not n a limiting sense.

What is claimed is:

1. A synthetic linear polyamide pigmented with 2,9-dimethyl-quinacridone, said polyamide being colored pink to deep bluish red and having been heated at a temperature within the range of from 350° to 700° F. while so pigmented.

2. A pigmented polyamide as defined in claim 1, in which the polyamide is a poly-ε-caproamide.

3. A pigmented polyamide as defined in claim 1, in which the polyamide is a linear polymer of hexamethylene diamine and adipic acid.

4. The process of producing a pigmented synthetic linear polyamide colored pink to deep bluish-red which comprises incorporating 2,9-dimethyl-quinacridone in the polyamide at a temperature within the range of 350° to 700° F.

5. The process of producing a pigmented synthetic linear polyamide as defined in claim 4 which comprises mixing a monomer of the polyamide with 2,9-dimethyl-quinacridone and polymerizing the resultant mixture.

6. The process as defined in claim 5, in which the monomer is ε-caprolactam and the polymerization is carried out by heating the mixture to a temperature within the range of from 350° to 575° F.

7. The process as defined in claim 4, in which the 2,9-dimethyl-quinacridone is mixed with the polyamide in amount to produce the desired shade from pink to deep bluish-red, the mixture is pelletized and the resultant pellets molded to produce a pigmented molded polyamide having the desired pink to deep bluish-red shade.

8. The process as defined in claim 5 which comprises coating the surface of the polyamide with 2,9-dimethyl-quinacridone in amount to produce the desired shade from pink to deep bluish-red, melting the coated polyamide to produce a molten mass containing the 2,9-dimethyl-quinacridone, and spinning the molten mass into filaments having the desired pink to deep bluish-red shade.

References Cited by the Examiner

UNITED STATES PATENTS

| 2,205,722 | 6/1940 | Graves | 260—37 |
| 2,345,533 | 3/1944 | Graves | 260—37 |
| 3,020,279 | 2/1962 | Woodlock et al. | 106—288 |
| 3,074,950 | 1/1963 | Dueschel et al. | 106—288 |
| 3,147,235 | 9/1964 | Zweidler et al. | 260—78 |
| 3,157,659 | 11/1964 | Dueschel et al. | 106—288 |

FOREIGN PATENTS

| 743,064 | 1/1956 | Great Britain. |

MORRIS LIEBMAN, *Primary Examiner.*

ALPHONSO D. SULLIVAN, *Examiner.*

T. D. KERWIN, A. H. KOECKERT, *Assistant Examiners.*